United States Patent [19]
Zorumski

[11] 3,830,335
[45] Aug. 20, 1974

[54] NOISE SUPPRESSOR

[75] Inventor: William E. Zorumski, Newport News, Va.

[73] Assignee: The United States of America as represented by the Administrator of the National Aeronautics and Space Administration, Washington, D.C.

[22] Filed: May 14, 1973

[21] Appl. No.: 359,957

[52] U.S. Cl. ............ 181/33 F, 181/33 C, 181/33 H, 181/33 L, 181/42
[51] Int. Cl. .......................... F01n 1/06, F01n 1/08
[58] Field of Search .... 181/33 C, 33 F, 33 D, 33 G, 181/33 H, 33 HA, 33 HB, 33 HC, 33 L, 35 B, 35 C, 36 R, 47 R, 47 A, 47 B, 55, 57, 72

[56] References Cited
UNITED STATES PATENTS

| 2,185,023 | 12/1939 | Crane | 181/47 A |
|---|---|---|---|
| 2,308,886 | 1/1943 | Mason | 181/47 R |
| 2,382,386 | 8/1945 | Arms | 181/33 HC |
| 2,995,199 | 8/1961 | Myers | 181/72 X |
| 3,011,584 | 12/1961 | Lemmerman et al. | 181/33 HB |
| 3,159,238 | 12/1964 | Shearer | 181/33 HC |
| 3,279,560 | 10/1966 | Hubrich | 181/33 D |
| 3,583,417 | 6/1971 | Clark et al. | 181/33 HA X |
| 3,704,763 | 12/1972 | Becker et al. | 181/53 X |

OTHER PUBLICATIONS

Cyril M. Harris, Handbook of Noise Control, 1957, pp. 21-18 and 21-19.

Primary Examiner—Richard B. Wilkinson
Assistant Examiner—Vit W. Miska
Attorney, Agent, or Firm—Howard J. Osborn; Wallace J. Nelson; John R. Manning

[57] ABSTRACT

A tuned noise suppressor apparatus to be incorporated in the inlet and exhaust ducts of turbofan engines and the like. The apparatus utilizes sound wave absorption, reflection, and incompatability for achieving high noise reduction in the short distance available. In addition, the apparatus has a duct of uniform inner diameter such that the duct flow is neither interrupted nor blocked in any manner.

11 Claims, 5 Drawing Figures

NOISE SUPPRESSOR

ORIGIN OF THE INVENTION

The invention herein described was made by an employee of the National Aeronautics and Space Administration and may be manufactured and used by or for the Government for Governmental purposes without the payment of any royalties thereon or therefor.

BACKGROUND OF THE INVENTION

This invention relates generally to noise attenuation and more specifically to an apparatus for reducing the turbomachinery noise emitted from a modern turbofan jet aircraft engine. Noise is one of the major contributors to the environmental pollution problem which plagues society. It is a waste product of transportation systems and along with air and water waste is rapidly deteriorating the environment. Because of the expanding noise pollution in the vicinity of large commercial airports as a result of the increasing number of jet aircraft now in use and the growing size of jet engines, the government and private industry determined to study the aircraft noise pollution problem and attempt solutions. One such solution being the subject of the present invention.

Typical turbofan jet engines emit turbomachinery noise from the inlet and fan discharge ducts and emit jet noise from the primary nozzle. Although jet noise is a significant source of noise for some operating conditions, the present invention is designed particularly for the reduction of internally generated turbomachinery noise. Studies have shown that in both the takeoff and landing of turbofan jet aircraft, turbomachinery noise often predominates over jet noise. The most common example of noise and the source of most of the complaints around airports is the high-pitch discrete-frequency whine which is emitted during landing approach.

Prior art attempts to reduce the fan noise emitted concentrated exclusively on the use of individual sound absorbing elements to line the engine ducts. These individual sound absorbing elements were not able to achieve sufficient noise reduction, without large weight and economic penalties, due to their use of only sound absorbing components. Also, these elements were sometimes positioned in the ducts so as to interrupt and block the flow. Therefore, there is a need in the art for a noise suppressor apparatus for use in a turbofan engine, and which achieves high turbomachinery noise reduction in a short distance.

It is therefore an object of the present invention to provide a noise suppressor apparatus for reducing turbomachinery noise emitted from turbofan engines.

Another object of the present invention is to provide a noise suppressor apparatus for turbofan engines which achieves high turbomachinery noise reduction without interrupting or blocking the flow in any manner.

Another object of the present invention is to provide a noise suppressor apparatus for the reduction of noise propagated through ducts.

SUMMARY

The foregoing and other objects are obtainable in the present invention by providing a plurality of acoustically-porous annular elements around the inner duct walls of a turbofan engine. The linear portion of the duct wall extending through each annular element constitutes the respective "duct region" for the element.

As a sound wave enters the duct region of the first element it develops into a characteristic pattern, the shape of which is determined by the duct cross-section and, acoustical porosity and backing depth of the element. The wave excites the air particles within the region and squeezes them into the acoustically-porous element. This squeezing converts some of the wave sound energy into heat energy and the sound level is thereby reduced.

The wave travels through the duct region of the first element to the duct region of the second element which has a smaller backing depth. The backing depth of the second element is chosen such that the sound pressure pattern of the second element is incompatible with the pattern of the first element. At the interface between the duct region of the first and second elements, the wave pattern is partially reflected back into the duct region of the first element and partially transmitted into the duct region of the second element. That portion of the wave reflected again excites the first element air particles and converts some of its sound energy into heat energy, thereby further reducing the sound level.

That portion of the wave transmitted into the duct region of the second element excites the air particles therein and squeezes them into the acoustically-porous second element. The wave again expends energy in squeezing the air particles and the sound level is further reduced.

The third element is identical to the first element and at the interface between the duct region of the second and third elements, the wave is partially transmitted into the duct region of the third element and partially reflected back into the duct region of the second element. That portion of the wave transmitted again excites the air particles, converts some of its sound energy into heat energy and still further reduces the sound level.

That portion of the wave reflected back into the second element again squeezes second element air particles further reducing the sound level. When the reflected wave reaches the interface between the duct region of the first and second elements it is again partially reflected and partially transmitted. The reflection and transmission at the interfaces between the first and second elements and between the second and third elements continues until the sound level is substantially reduced.

The noise suppressor apparatus of the present invention is not to be confused with the noise suppressors currently in use. While the noise suppressors currently in use utilize the basic exciting and squeezing approach to sound reduction, they make no provision for or contemplate the use of wave pattern incompatibility to induce wave reflection and thereby further reduce the sound level. The combination of wave-absorbing elements working in conjunction with wave-reflecting elements to reduce the sound level emitted from ducts is considered to be new and novel.

IN THE DRAWINGS

A more complete appreciation of the present invention and many of the attendant advantages will be readily apparent as the same becomes better understood by reference to the following detailed description when considered in connection with the accompanying drawings, wherein.

DETAILED DESCRIPTION OF THE INVENTION

Figure 1:
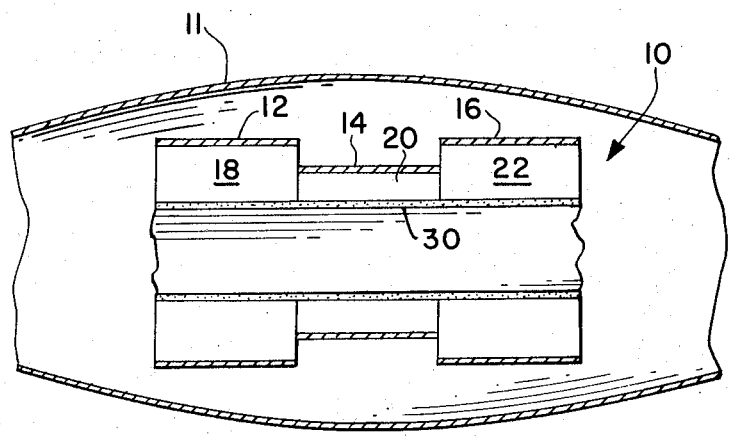
FIG. 1 is a side view of the noise suppressor apparatus of the present invention disposed in an engine nacelle.

Referring now to the drawings where like reference numerals refer to like parts throughout the several drawings and more particularly to FIG. 1 there is shown a side view of a noise suppressor apparatus of the type disclosed in the present invention and generally designated by reference numeral 10.

Apparatus 10 is incorporated into the inlet or exhaust duct of a turbofan jet engine 11 and is comprised of three annular casings 12, 14 and 16 having identical inner diameters and having annular acoustically-porous elements 18, 20 and 22, respectively, disposed therein. As used in this description and appended claims, the term "inner diameter" means that dimension which corresponds to the inside diameter of the aperture of an annular element. Casings 12, 14 and 16 are connected by suitable means, such, for example, seam welds, in a face-to-face relationship, such that an unitary structure is formed. The identical inner diameters of casings 12, 14 and 16 serve to form a uniform duct through the unitary structure, such that the engine flow is not blocked or interrupted.

Figure 2:
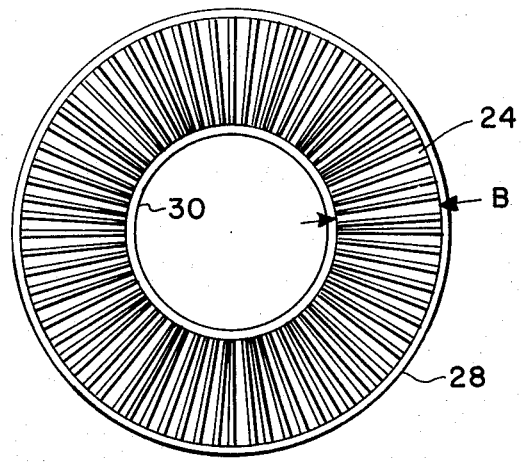
FIG. 2 is an end view of a typical element of noise suppressor apparatus of the present invention.
Figure 3:
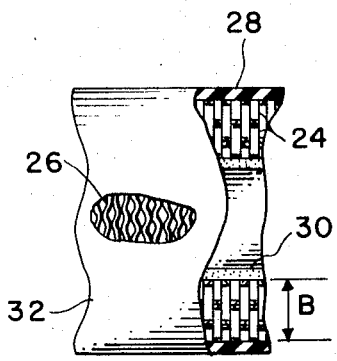
FIG. 3 is a view partially cross-sectional, with parts broken away, of a typical element of the present invention.
Figure 4:
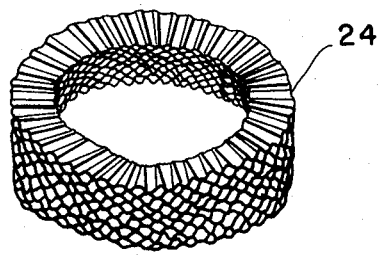
FIG. 4 is a perspective view of a typical element of the present invention.

In FIGS. 2, 3 and 4 there is shown a typical annular acoustically-porous element of the present invention. The element is comprised of a plurality of corrugated annular rings 24, having uniform inner diameters and uniform backing depths B, and connected in a face-to-face relationship by suitable means, such, for example, spot welds. As used in this description and appended claims, the term "backing depth" means that dimension in an annular element which corresponds to the outside diameter of the annular element minus the inside diameter of the element. Honeycomb-like cavities 26 are formed radially between the corrugated faces of rings 24. A liner 28 formed of a sealer material, such, for example, rubber sheeting, having a width equal to that of the element is in intimate contact with and surrounds the outer circumferential surface of the element and seals the outer radial ends of cavities 26. A liner 30, formed of an acoustically-porous material having a width equal to that of the element, seals the inner radial ends of cavities 26. The backing depth dimension B of elements 18 and 22 is equal to approximately ⅜ of the wave length of the sound waves emitted from the engine. The backing depth B of element 20 is equal to approximately ⅛ of the wave length of the sound emitted from the engine.

Figure 5:
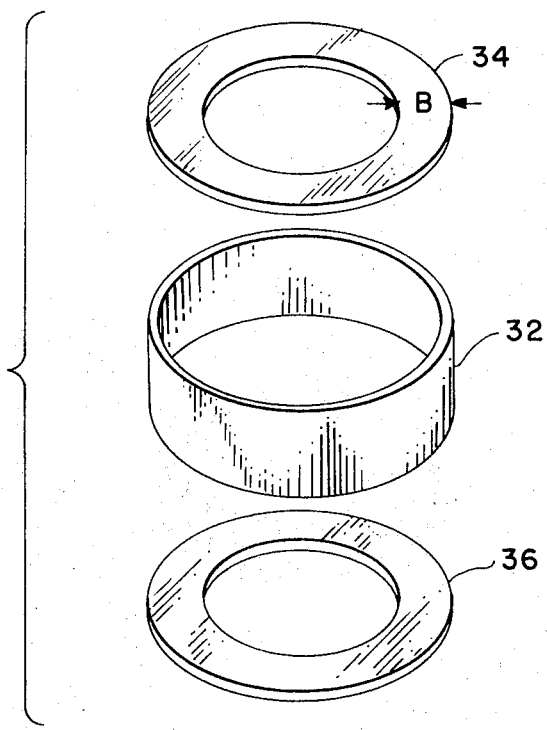
FIG. 5 is an exploded view of a typical casing of the present invention.

In FIG. 5 there is shown an exploded view of a typical casing of the present invention. The casing is formed of an annular jacket 32, having a width equal to that of the element to be enclosed therein and an inner diameter matching the outer diameter of the annular acoustically porous element to be enclosed therein. The casing has an annular cover plate 34 and an annular bottom plate 36, both having annular dimensions which match that of the element to be enclosed therein.

OPERATION

A pulsating high energy sound wave is emitted from the turbofan jet engine and enters the duct region of element 18 housed in casing 12. The wave develops into one of a discrete set of patterns or modes characteristic of element 18 and determined by the element cross-sectional area, the porosity of liner 30 and the backing depth B of rings 24 used to form element 18. The sound wave travels through the duct region of element 18 and excites and agitates the air particles near the surface of liner 30. The air particles are squeezed back and forth through liner 30, entering and exiting cavities 26 behind liner 30. As the air particles are squeezed back and forth they are resisted by liner 30 and heat is generated. The heat comes from sound energy which has been converted into heat energy and, the engine sound level is reduced. As used in this description and appended claims, the terms "sound level" and "level of sound" are used to mean that quality of sound commonly known as loudness and measured in units of decibels.

Element 20 is structurally similar to element 18, however, the backing depth has been changed such that the wave modes in element 20 will be incompatible to the wave modes in element 18. At the interface between the duct regions of elements 18 and 20 the waves are partially transmitted into the duct region of element 20 and are partially reflected back into the duct region of element 18, wherein those parts of the waves reflected and those parts of the waves transmitted continue the squeezing action established in element 18 and the sound level is further reduced.

Element 22 is identical to element 18 such that its wave modes will be incompatible to waves travelling through element 20. At the interface between the duct region of elements 20 and 22 the sound waves are partially transmitted into element 22 and are partially reflected back into the duct region of element 20. Those parts transmitted continue the squeezing action in element 22 and the sound level is further reduced. Those parts reflected travel toward element 18 and at the interface between the duct regions of elements 18 and 20 are again partially transmitted and partially reflected. The parts of the sound waves originally transmitted into the duct region of element 22 exit into the atmosphere. The portions of the sound waves remaining in the duct region of element 20 are partially reflected and partially transmitted each time they cross the interface between the duct regions of elements 18 and 22.

It can now be seen that the use of a noise suppressor of the present invention substantially reduces the sound level emitted from turbofan engines as the sound is both transmitted and absorbed and reflected and absorbed, due to the incompatibility between the wave modes of the adjacent elements of the apparatus.

Experiments have shown that one method for causing the modes of elements 18 and 22 to be incompatible with the mode of element 20, such that wave reflection will occur, is to make the backing depth B of elements 18 and 22 in the range of $\lambda(n + \frac{1}{4}) < B < \lambda(n + \frac{1}{2})$ wherein $n$ is a non-negative integer and $\lambda$ is the wave length of the sound emitted from the engine and the backing depth B of element 20 must be in the range of $\lambda(n) < B < \lambda(n + ¼)$.

In a specific example of the noise suppressor apparatus of the present invention, rings 24 are formed of corrugated stainless steel. The backing depth B for rings 24 in elements 18 and 22 is 9 cm and is 3 cm in element 20. The inside diameter of elements 18, 20 and 22 is 38 cm. The width of elements 18 and 22 is 9.5 cm and the width of element 20 is 19 cm. Liner 30 has a width of 9.5 cm and is formed of "Feltmetal", a porous metallic material manufactured by the Brunswick Corporation. Liner 28 is formed of a common rubber sheet material and has a width of 9.5 cm. Cover plate 34 and bottom plate 36 are formed of sheet metal and have inner diameters of 38 cm and backing depth of 9 cm for elements 18 and 22 and 3 cm for element 20. Jacket 32 is formed of sheet metal and has a width of 9.5 cm and an outside diameter of 47 cm in elements 18 and 22 and 41 cm in element 20.

Although the invention has been described relative to a specific embodiment thereof, it is not so limited and the specific example is for illustration of the principle only and is not intended to serve as a limitation thereof. Thus, many modifications and variations of the specific embodiment will be readily apparent to those skilled in the art in light of the above teachings. It is therefore to be understood that within the scope of the appended claims the invention may be practiced otherwise than as specifically described herein.

What is new and desired to be secured by Letters Patents of the United States is:

1. An apparatus for reducing the level of sound traveling through a duct comprising in combination:
   a plurality of acoustically-absorbent annular elements disposed in a face-to-face adjacent relationship such that an integral unit is formed having a continuous duct therethrough,
   each of said elements having a uniform inner diameter with selected ones of said elements having dissimilar backing depth dimensions;
   means mounted in each of said elements for developing a sound wave traveling therethrough into a characteristic mode which is incompatible with the mode developed by the same means in the next adjacent element such that at the interface therebetween the traveling wave is partially reflected back into the element through which it was originally traveling and is partially transmitted into the next adjacent element, wherein the sound wave is partially absorbed while traveling through each of said plurality of elements into which it has been transmitted and in addition is partially absorbed while traveling through each of said plurality of elements into which it has been reflected,
   thereby reducing the level of sound traveling through the duct by the continuous alternating cycle of transmission-absorption and reflection-absorption.

2. Tha apparatus as in claim 1 wherein the backing depth dimension of one element of said plurality of annular elements is defined by the equation $\lambda(n + ¼) < B < \lambda(n + ½)$, wherein $\lambda$ is the length of the sound wave to be absorbed, $n$ is a non-negative integer, and B is the backing depth.

3. The apparatus as in claim 1 wherein the backing depth dimension of the next adjacent element of said plurality of annular elements is defined by the equation $\lambda(n) < B < \lambda(n + ¼)$ wherein $\lambda$ is the length of the sound wave to be absorbed, $n$ is a non-negative integer, and B is backing depth.

4. The apparatus as in claim 1 wherein each of said elements is comprised of a plurality of corrugated rings having identical inner diameter dimensions and being connected in a face-to-face relationship such that an integral honeycomb-like unit having a uniform duct therethrough is formed,
   the outer radial ends of said plurality of rings being in intimate contact with a sheet of sealer material,
   the inner radial ends of said plurality of rings being in intimate contact with a sheet of acoustically porous material.

5. The apparatus as in claim 4 wherein honeycomb cavities are formed between each of said plurality of face-to-face corrugated annular rings,
   said cavities extending radially through said annular element from the inner radial ends of said annular rings to the outer radial ends of said annular rings.

6. The apparatus as in claim 4 wherein each of said elements is substantially enclosed in an annular casing, and wherein each of said casings has an identical inner diameter matching that of said element enclosed therein and each of said casings being connected in a face-to-face relationship such that an integral unit having a uniform duct therethrough is formed.

7. The apparatus as in claim 4 wherein said corrugated rings are formed of stainless steel, and said sealer material is rubber sheeting.

8. An apparatus for reducing the level of sound traveling in ducts through utilization of sound wave incompatibility reflection and transmission comprising:
   first, second and third acoustically-absorbent annular elements,
   each of said elements having identical inner diameter dimensions;
   said first and third elements having an identical backing depth dimension dissimilar from that of said second element; means mounted in said first and third elements for developing a sound wave traveling therethrough into a mode characteristic of said first and third elements;
   means mounted in said second element for developing a sound wave traveling therethrough into a mode characteristic of said second element and incompatible with the mode characteristic of said first and third elements;
   first, second and third annular casings, each having an inner diameter and backing depth of a dimension corresponding to that of said first, second and third elements;
   said first, second and third casings containing, respectively, said first, second and third elements and being connected in a face-to-face relationship such that an integral unit having a uniform duct therethrough is formed,
   whereby a sound wave traveling through each of said first, second and third elements will be partially transmitted into the next adjacent element and partially absorbed therein and whereby that same sound wave traveling through each of said first, second and third elements will be reflected at the interface therebetween back into the element through which it was traveling and be partially absorbed therein.

9. The apparatus as in claim 8 wherein the backing depth of said first and third elements is defined by the equation $\lambda (n + ¼) < B < \lambda (n + ½)$ wherein $\lambda$ is the length of a sound wave having the frequency of those sound waves travelling through the apparatus, $n$ is a non-negative integer and B is the backing depth.

10. The apparatus as in claim 8 wherein the backing depth of said second element is defined by the equation $\lambda (n) < B < \lambda (n + ¼)$ wherein $\lambda$ is the length of a sound wave having the frequency of those sound waves travelling through the apparatus, wherein $n$ is a non-negative integer, and B is the backing depth.

11. A method for reducing the level of sound of a sound wave travelling through a duct, including the steps of:

providing a travelling sound wave;

providing a plurality of peripheral acoustically-absorbent elements having uniform inner diameter dimensions and having alternating first and second backing depth dimensions such that the characteristic mode of the sound wave travelling through said elements having backing depths of the first dimension is incompatible with the characteristic mode of the sound wave travelling through said elements having backing depths of said second dimension;

disposing the elements in an alternating face-to-face relationship such that an integral unit having a uniform duct formed therethrough is formed;

introducing said travelling sound wave into the integral unit, whereby the sound wave travels through the first element and is partially absorbed therein;

and at the interface between the first and second elements it is partially reflected back into the first element being further absorbed therein and is partially transmitted into the second element wherein it is further absorbed and at the interface between the second and third elements it is again partially reflected and partially transmitted into the second and third elements, respectively, and further absorbed therein and wherein that portion of the wave transmitted into the third element is emitted from the integral unit at a reduced level of sound and wherein that portion of the wave reflected back into the second element is partially reflected and transmitted at each element interface and is further absorbed.

* * * * *